United States Patent
Morita

(10) Patent No.: US 8,107,120 B2
(45) Date of Patent: Jan. 31, 2012

(54) IMAGE FORMING APPARATUS

(75) Inventor: Keisuke Morita, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 988 days.

(21) Appl. No.: 12/050,656

(22) Filed: Mar. 18, 2008

(65) Prior Publication Data

US 2008/0266607 A1  Oct. 30, 2008

(30) Foreign Application Priority Data

Apr. 24, 2007 (JP) .................... 2007-114547

(51) Int. Cl.
G06F 15/00 (2006.01)
G06K 1/00 (2006.01)
G06K 15/00 (2006.01)
G06F 3/12 (2006.01)

(52) U.S. Cl. ..................... 358/1.18; 358/1.13
(58) Field of Classification Search .............. None
See application file for complete search history.

(56) References Cited

U.S. PATENT DOCUMENTS 6,804,024 B1 * 10/2004 Kizaki et al. .......... 358/1.18
7,817,304 B2 * 10/2010 Sato ....................... 358/1.9

FOREIGN PATENT DOCUMENTS

JP  7-13470  1/1995
JP  2004-112236  4/2004

* cited by examiner

Primary Examiner — Douglas Tran
(74) Attorney, Agent, or Firm — Finnegan, Henderson, Farabow, Garrett & Dunner, L.L.P.

(57) ABSTRACT

Disclosed is an image forming apparatus which forms an image on a sheet including: an image forming section to form images on sheets according to a plurality of page image data divided in a plurality of chapters; a finisher section for forming a book with the sheets divided in chapters; and a control section to combine heading image data with the page image data with respect to chapters in a matter that positions of the heading image data to discern chapters are along a fore edge of the book and to allow the image forming section to form the images when the book is formed by the finisher section.

6 Claims, 13 Drawing Sheets

THICKNESS DIRECTION

THICKNESS DIRECTION

FIG.12

| JOB DATA | | | | |
|---|---|---|---|---|
| PAGE COMMON DATA | | CHAPTER DIVISION | YES | D1 |
| | | CHAPTER DIVISION NUMBER | N | D2 |
| | | HEADING IMAGE OVERLAY | ON | D3 |
| | | COLUMN NUMBER | S | D4 |
| | | NUMBER OF CHAPTERS PER COLUMN | NS | D5 |
| | | BINDING POSITION | LEFT | D6 |
| | | CHAPTER 1: POSITION (x COORDINATE) | x1 | D7a |
| | | CHAPTER 1: POSITION (y COORDINATE) | y1 | D7b |
| | | CHAPTER 1: LENGTH | * | D7c |
| | | CHAPTER 1: WIDTH | * | D7d |
| | | ... | ... | |
| | | CHAPTER N: POSITION (x COORDINATE) | xn | D7a |
| | | CHAPTER N: POSITION (y COORDINATE) | yn | D7b |
| | | CHAPTER N: LENGTH | * | D7c |
| | | CHAPTER N: WIDTH | * | D7d |
| | | SHIFT | ON | D8 |
| | | REDUCTION | ON | D9 |
| | | SHIFT AMOUNT[mm] | * | D10 |
| | | REDUCTION PERCENTAGE[%] | * | D11 |
| | | CUTTING | YES | D12 |
| | | SHEET CHANGE WITH RESPECT TO CHAPTERS | ON | D13 |
| | | CHAPTER 1: SHEET TYPE | COATED PAPER | D14a |
| | | CHAPTER 1: COLOR | YELLOW | D14b |
| | | ... | ... | |
| | | CHAPTER N: SHEET TYPE | * | D14a |
| | | CHAPTER N: COLOR | * | D14b |
| PAGE INDIVIDUAL DATA | PAGE 1 | IMAGE STORAGE ADDRESS | ... | D21 |
| | | CHAPTER NUMBER | 1 | D22 |
| | ... | ... | ... | |
| | PAGE M | IMAGE STORAGE ADDRESS | ... | D21 |
| | | CHAPTER NUMBER | * | D22 |

131 = whole table; 131a = PAGE COMMON DATA section; 131b = PAGE INDIVIDUAL DATA section

IMAGE FORMING APPARATUS

BACKGROUND

1. Field of the Invention

The present invention relates to an image forming apparatus such as a copier, printer, facsimile and the like, which forms an image on a sheet.

2. Description of Related Art

Lately, an image forming apparatus is known which includes a function to divide a plurality of page image data into a plurality of groups (hereinafter referred to as chapter) or when an image is formed on sheets according to the page image data, a function to insert a sheet (hereinafter referred to as interleaving sheet) between a stack of sheets with a different color with respect to chapters so that the stack of sheets can be discerned with respect to chapters.

For example, Japanese Patent Application Laid-Open Publication No. 7-13470 discloses an image forming apparatus which is provided with a chapter division section which forms an image of an image data of a designated page of a document on a front of a sheet then prints the pages of the document after the designated page on the back and the front of the sheet in this order, and a sheet interleaving section to print a designated document on a surface of a specific interleaving sheet.

Japanese Patent Application Laid-Open Publication No. 2004-112236 discloses an image forming apparatus which includes a function to print a stamp on interleaving sheets for dividing chapters which enables setting the printing color of the stamp the same color as the selected color mode (for example, a color different from the printing color for sheets other than the interleaving sheet) and which enables a user to set the printing position of the stamp to a desired position.

However, with the above image forming apparatuses, the interleaving sheets are used so as to identify from appearance the sheets with the image formed with respect to chapter, thus depending on the type of interleaving sheet, it is difficult to discern the division of the chapters. When a stamp is printed on an interleaving sheet, it is complicated for a user to freely set a printing position of the stamp, and when a plurality of sheets including a plurality of chapters are stacked, it is difficult to discern at one glance the division of the chapters by printed stamps.

SUMMARY

The present invention has been made in consideration of the above problems, and it is one of main objects to easily discriminate each chapter in a stack of sheets including a plurality of chapters.

In order to achieve at least one of the above-described objects, according to a first aspect of the present invention, there is provided an image forming apparatus which forms an image on a sheet, comprising:

an image forming section to form images on sheets according to a plurality of page image data divided in a plurality of chapters;

a finisher section for forming a book with the sheets divided in chapters; and a control section to combine heading image data with the page image data with respect to chapters in a matter that positions of the heading image data to discern chapters are along a fore edge of the book and to allow the image forming section to form the images when the book is formed by the finisher section.

BRIEF DESCRIPTION OF THE DRAWINGS

The present invention will become more fully understood from the detailed description given hereinbelow and the appended drawings, and thus are not intended to define the limits of the present invention, and wherein;

FIG. 12 is a diagram showing an example of a job data;

DETAILED DESCRIPTION OF PREFERRED EMBODIMENTS

A preferred embodiment reflecting an aspect of the present invention will be described in detail with reference to the drawings. However, the scope of the invention is not limited to the illustrated examples.

Figure 1:
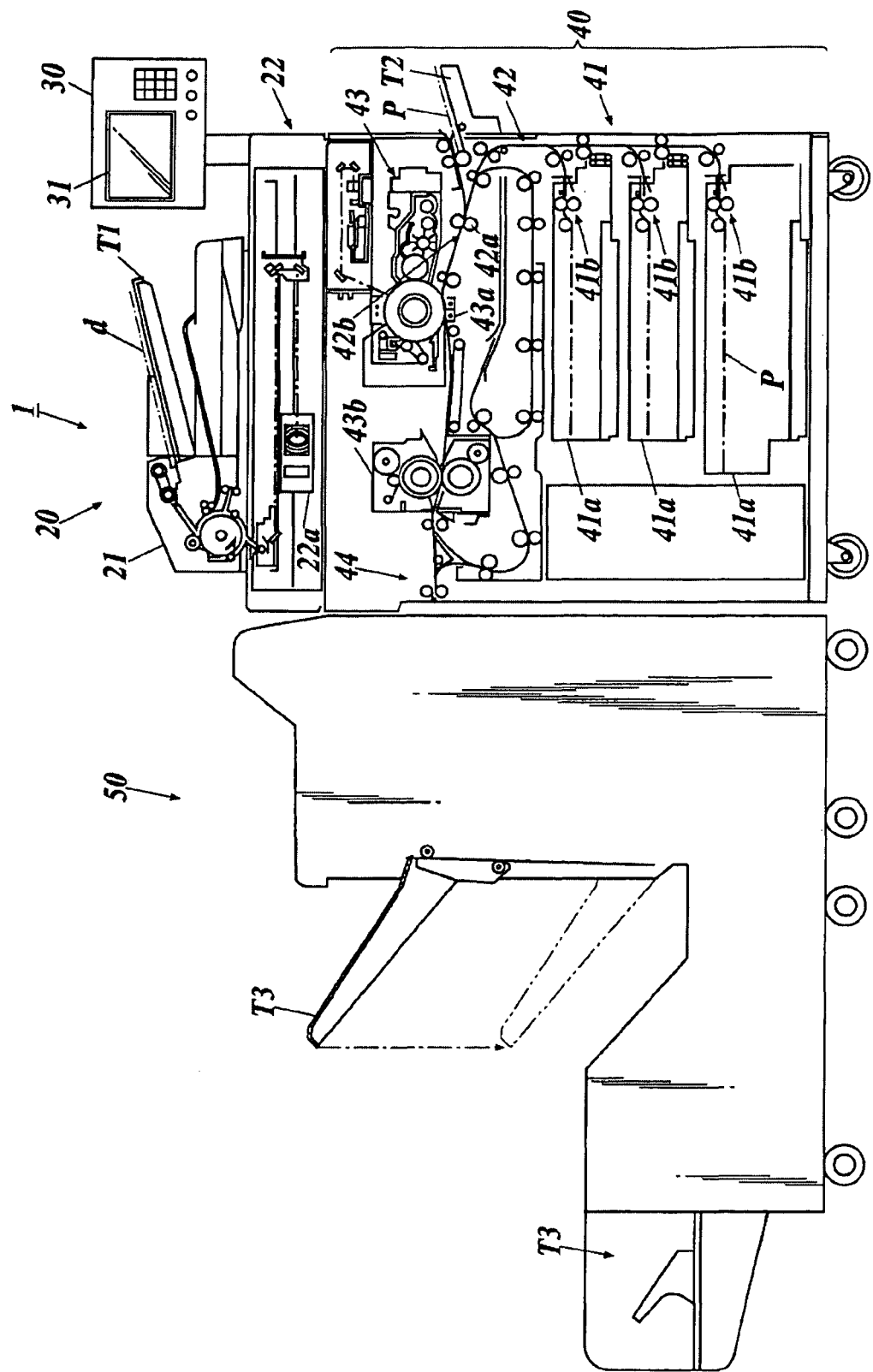
FIG. 1 is a cross-sectional view schematically showing a configuration of an image forming apparatus.
Figure 2:
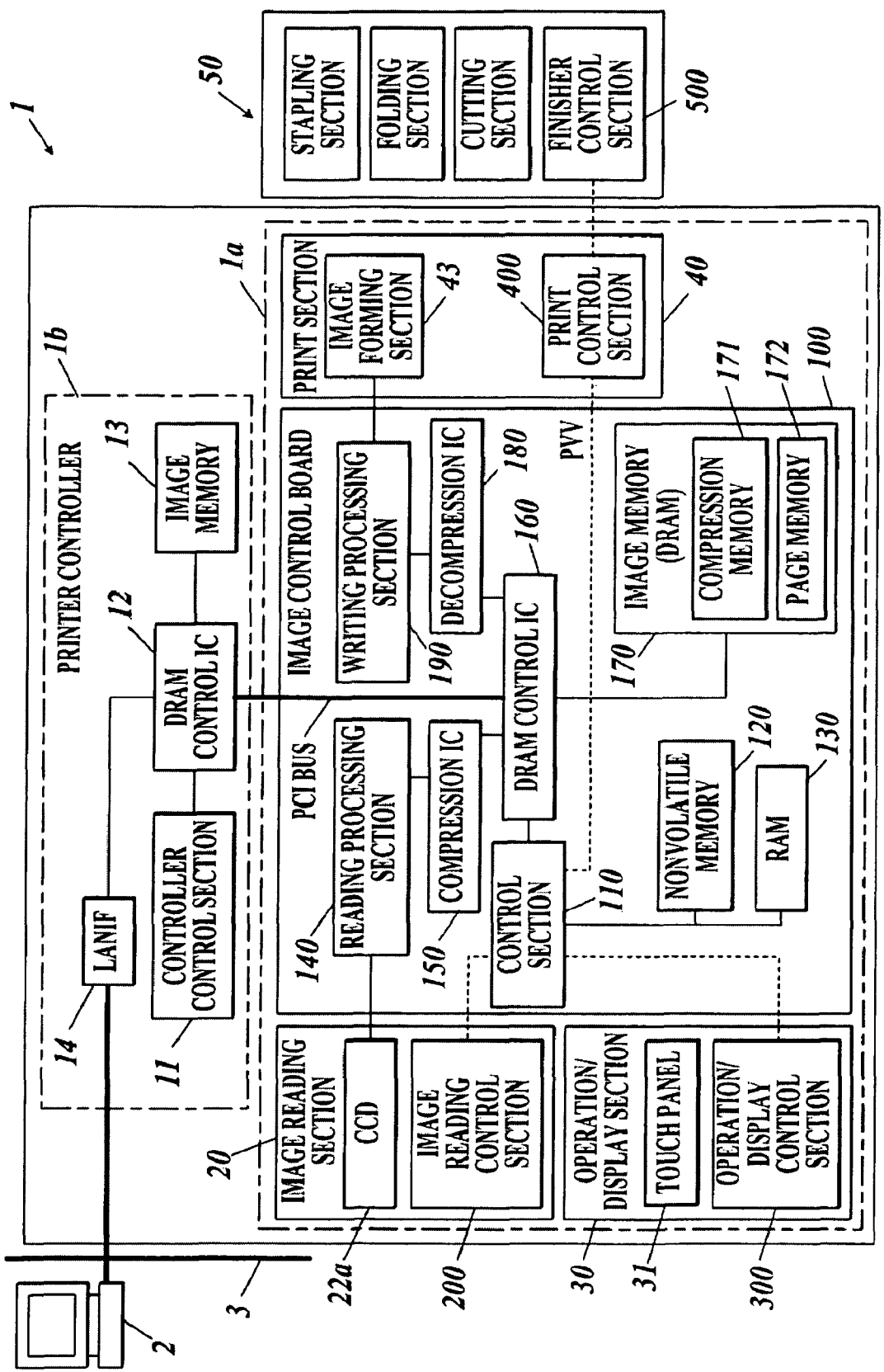
FIG. 2 is a block diagram showing a control system of an image forming apparatus.

A configuration of an apparatus of the present embodiment is described with reference to FIG. 1 and FIG. 2. FIG. 1 is a cross-sectional view schematically showing a configuration of an image forming apparatus 1 of the present embodiment. FIG. 2 is a block diagram showing a control system of an image forming apparatus 1.

As shown in FIG. 1, the image forming apparatus 1 is a digital multifunction apparatus comprising an image forming section for forming an image on a sheet P according to image data read from a document or received from an external apparatus or the like, and a finisher device which performs punching processing, stapling processing, folding processing, cutting processing, etc., on a sheet with an image formed. As shown in FIG. 1, the image forming apparatus 1 comprises, an image reading section 20, an operation/display section 30 including a first input section, a second input section, and a third input section, a print section 40 and a finisher device 50.

The image reading section 20 comprises an automatic document feeding section 21 called an ADF (Auto Document Feeder) and a reading section 22. A document d placed on a document tray T1 of the automatic document feeding section 21 is conveyed to a reading position on a contact glass of the reading section 22 where one side or both sides of the document d is exposed to light from an optical system of the reading section 22 and an image of the document d is read by a CCD (Charge Coupled Device) 22a. Here, image is not limited to image data such as a figure, a photograph, etc., and includes text data and the like, such as a character, symbol, etc.

The image data (analog image signal) read by the reading section 22 is output to a later-described image control board, and after A/D conversion and various image processing by the image control board, the data is output to the print section 40.

The operation/display section 30 comprises an LCD (Liquid Crystal Display), a touch panel 31 provided so as to cover the LCD and a group of other operation keys (not shown). The operation/display section 30 receives input from a user and then outputs the input information to the image control board and also displays various processing results, various setting screens for receiving input of various setting conditions, etc. according to a display signal input from the image control board.

Figure 3:
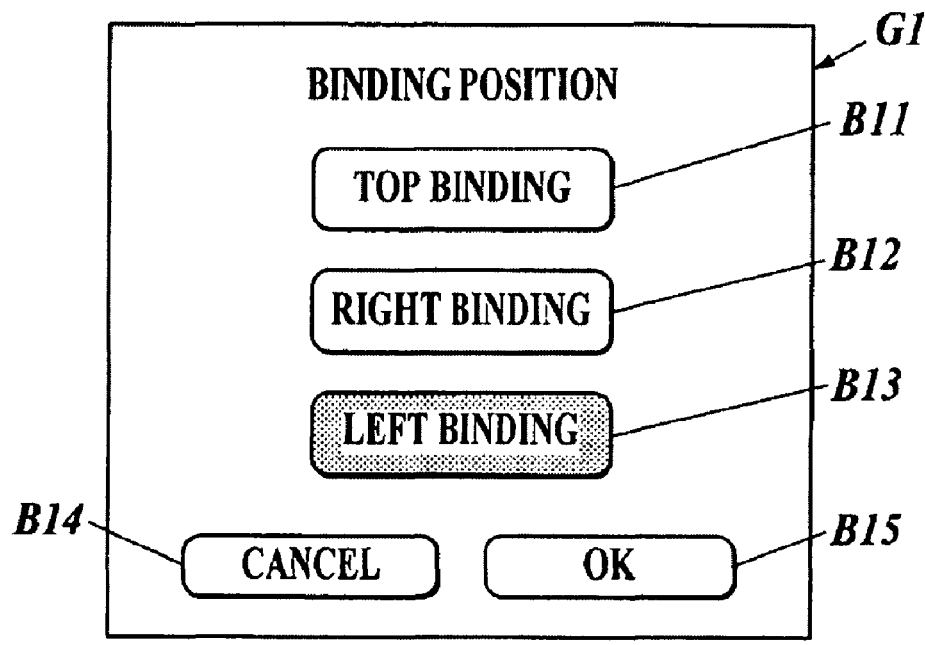
FIG. 3 is a diagram showing an example of a binding position setting screen.
Figure 4:
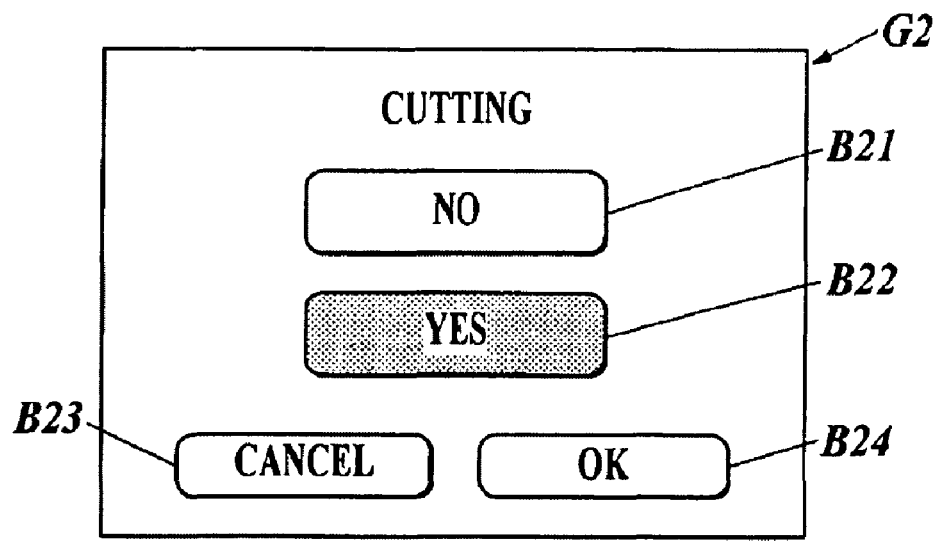
FIG. 4 is a diagram showing an example of a cutting setting screen.
Figure 5:
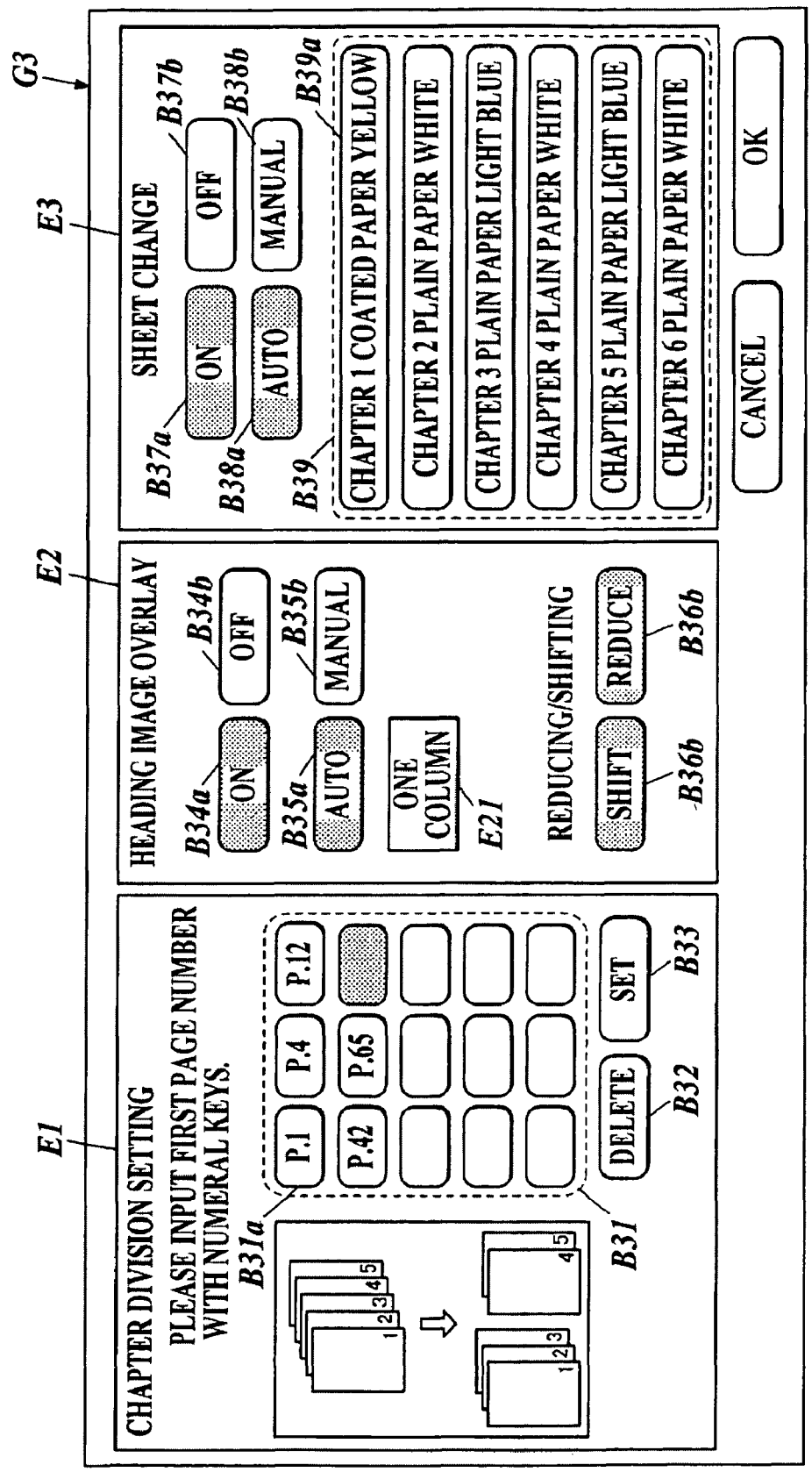
FIG. 5 is a diagram showing an example of a chapter setting screen.
Figure 6A:
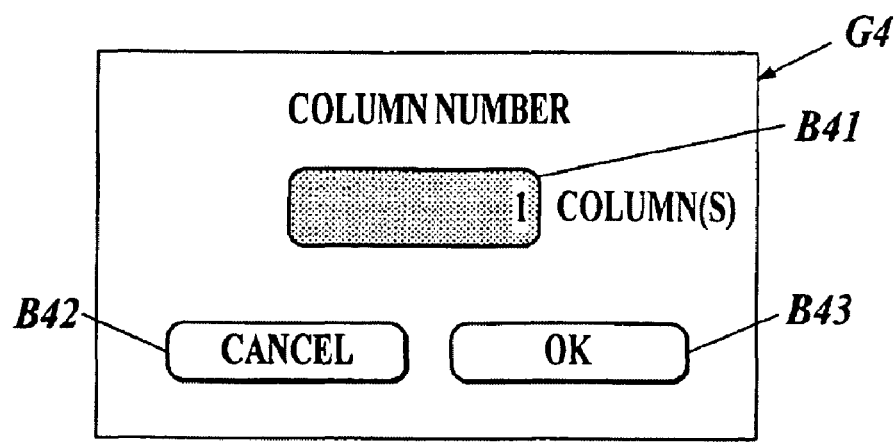
FIG. 6A is a diagram showing an example of a column number setting screen.
Figure 6B:
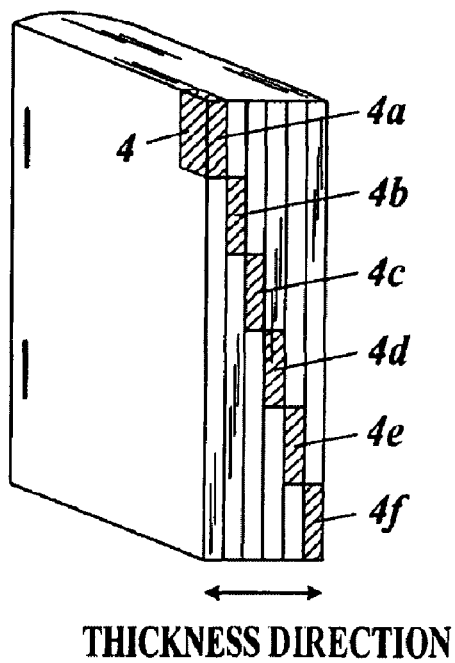
FIG. 6B is a diagram showing an example of a side view of a book.
Figure 6C:
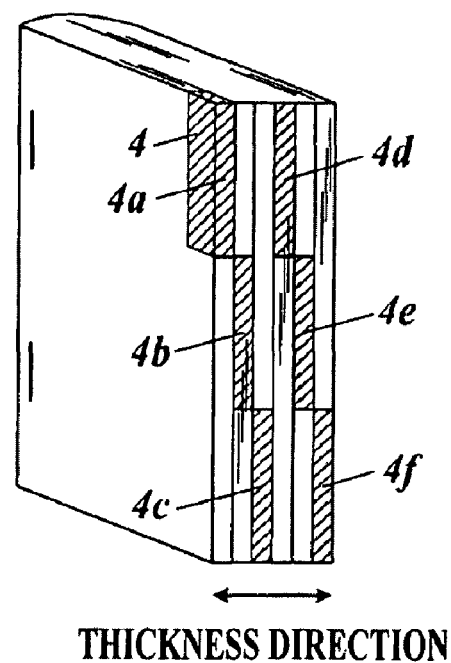
FIG. 6C is a diagram showing an example of a side view of a book.
Figure 7:
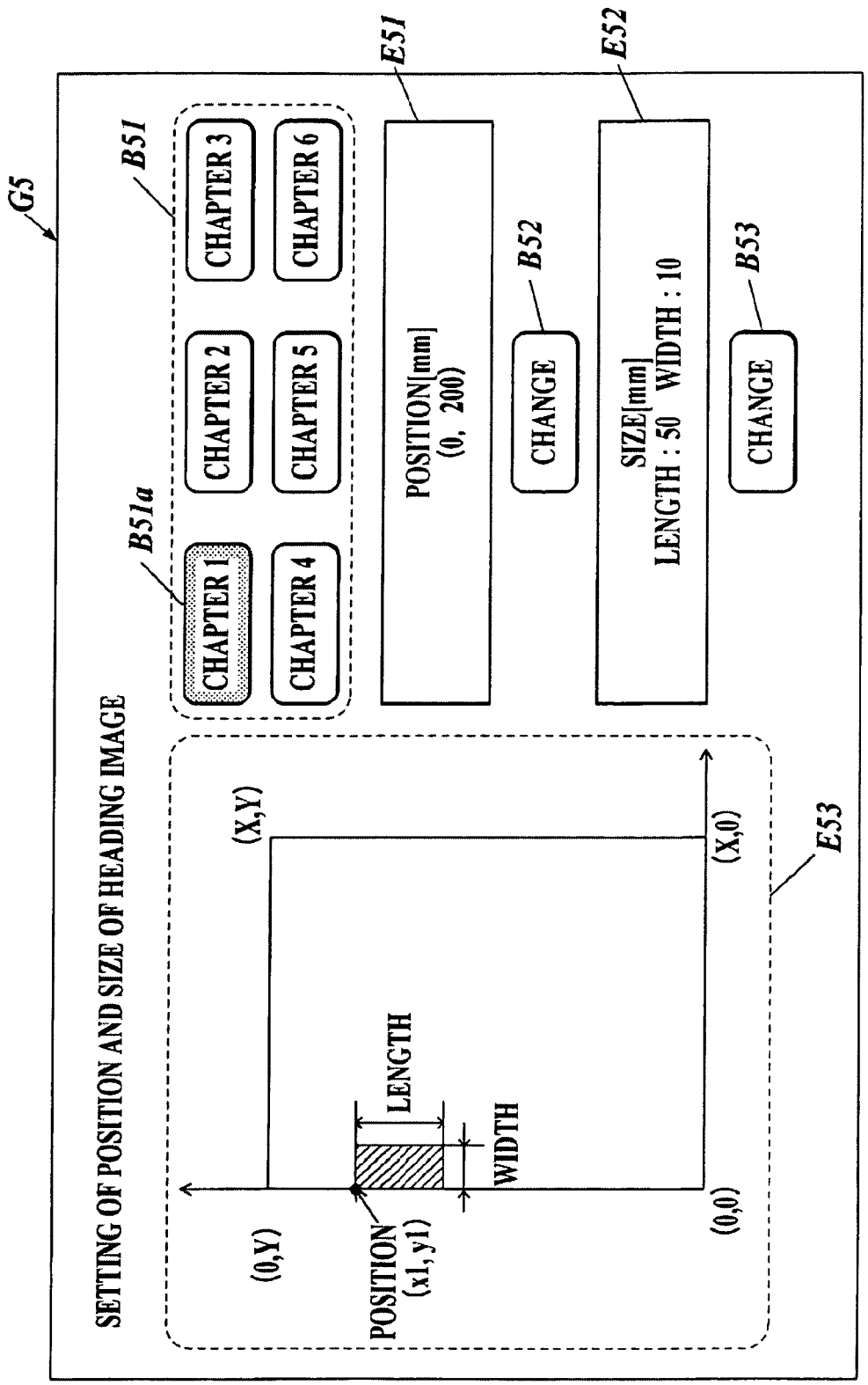
FIG. 7 is a diagram showing an example of a heading image manual setting screen.
Figure 8:
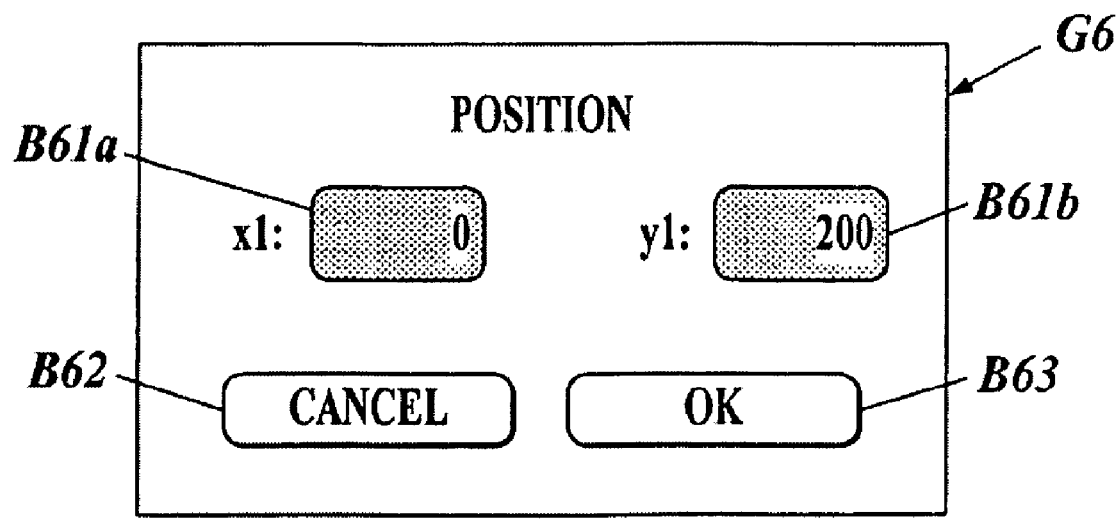
FIG. 8 is a diagram showing an example of a position setting screen.
Figure 9:
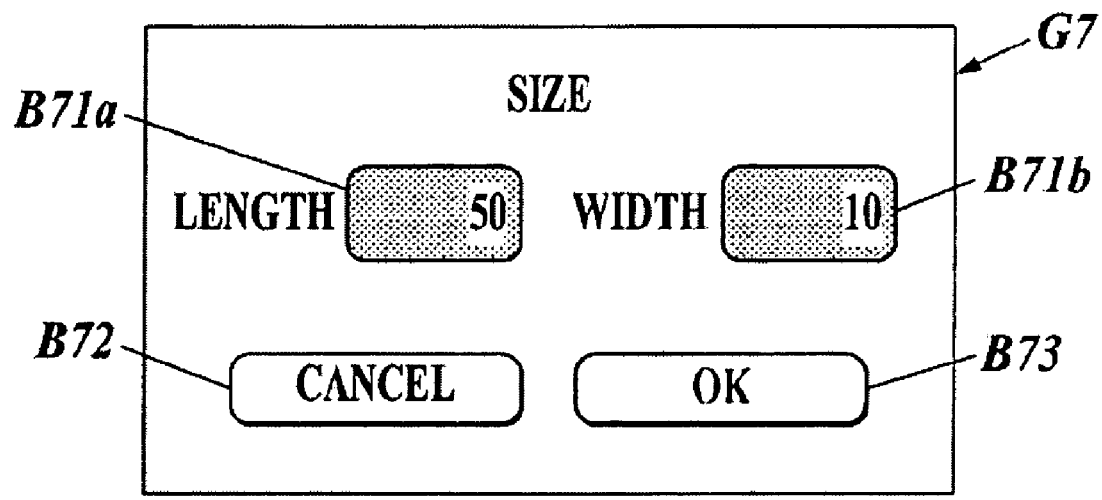
FIG. 9 is a diagram showing an example of a size setting screen.
Figure 10:
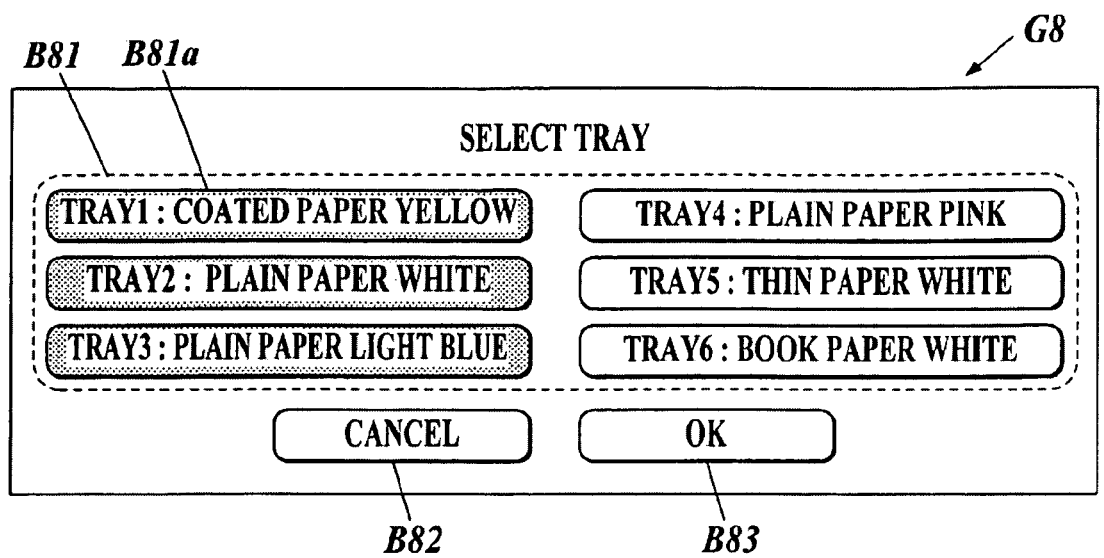
FIG. 10 is a diagram showing an example of a tray setting screen.
Figure 11:
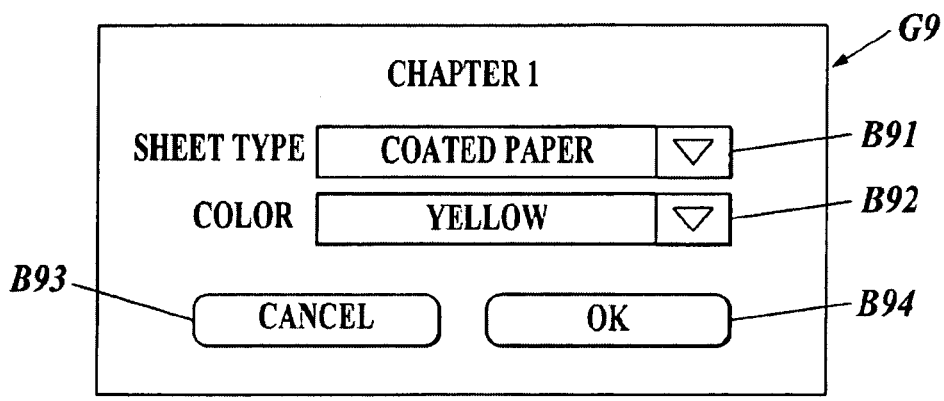
FIG. 11 is a diagram showing an example of a sheet setting screen with respect to chapters.

Various setting screens as shown in FIG. 3 to FIG. 11 are displayed on the touch panel 31 of the operation/display section 30. FIG. 3 shows an example of a binding position setting screen G1, FIG. 4 shows an example of a cutting setting screen G2, FIG. 5 shows an example of a chapter setting screen G3, FIG. 6A shows an example of a column number setting screen G4, FIG. 7 shows an example of a heading image manual setting screen G5, FIG. 8 shows an example of a position setting screen G6, FIG. 9 shows an example of a size setting screen G7, FIG. 10 shows an example of a tray setting screen G8 and FIG. 11 shows an example of a sheet setting screen with respect to chapters G9.

The binding position setting screen G1 shown in FIG. 3 is a screen for setting a binding position of binding a plurality of sheets in the stapling section when a book is formed by binding a plurality of sheets on which images are formed in the image forming apparatus 1 with stapling processing in the stapling section of the finisher device 50.

As shown in FIG. 3, the binding position setting screen G1 includes, from a front view of a book formed by binding a plurality of sheets, a top binding button B11 for binding a top portion, a right binding button B12 for binding a right portion, a left binding button B13 for binding a left portion, a cancel button B14 and an OK button B15. By pushing down the OK button B15, the binding position shown by any of the selected buttons B11 to B13 is set.

The cutting setting screen G2 shown in FIG. 4 is a screen for setting whether or not to perform cutting processing in the cutting section of the finisher device 50 to the sheets with the image formed.

As shown in FIG. 4, the cutting setting screen G2 includes a no button B21 for showing a setting of not performing the cutting processing, a yes button B22 for showing a setting of performing the cutting processing, a cancel button B23 and an OK button B24. By pushing down the OK button B24, whether or not to perform the cutting processing which is shown by one of the selected buttons B21 or B22 is set.

The chapter setting screen G3 shown in FIG. 5 includes a chapter division setting area E1, a heading overlay setting area E2 and a sheet changing area E3. The chapter division setting area E1 is a screen for setting a plurality of chapter division of an image data including a plurality of page image data.

The chapter division setting area E1 shown in FIG. 5 includes a chapter division button group B31 which includes a plurality of chapter division buttons B31a for receiving input of a page number of the page image data which is to be the first page of each chapter, a delete button B32 and a set button B33. When any of the chapter division buttons B31a is selected and the page number of the page image data which is to be the first page of each chapter is input with the numeric keys of the operation/display section 30, the page number is displayed in the selected chapter division button B31a and the first page of the chapter is set. In the chapter division setting area E1, the first pages are set the plurality of chapter division buttons B31a, and by pushing down the set button B33, the chapter division of the plurality of page image data is set. When the chapter division button B31a with the first page set is selected and the delete button B32 is pushed down, the set first page is deleted and the set chapter division is cancelled.

When a book which is divided in chapters is formed in the finisher device 50, the heading overlay setting area E2 shown in FIG. 5 includes an ON button B34a for combining heading image data with page image data so that the heading image data which include the heading image for discerning each chapter is positioned along a fore edge of the book and an OFF button B34b for not combining the heading image data with the page image data.

Heading image data is image data for forming a heading image to discern each chapter in a position along a fore edge of a book and has a set size (length and width). Heading images formed from heading image data are images such as solid shading, hatching, pattern, etc.

When the ON button B34a is selected, an auto-combining button B35a and a manual combining button B35b included in the heading overlay setting area E2 become effective.

The auto-combining button B35a is a button for displaying the column number setting screen G4 and setting the position and the image size when the heading image data is combined with the page image data according to the later-described column number, number of chapters, binding position, etc. set on the column number setting screen G4. The manual combining button B35b is a button for displaying the manual setting screen G5 for a user to freely set the position or image size when the heading image data is combined with the page image data.

The column number setting screen G4 shown in FIG. 6A is a screen which functions as the first input screen for setting a number (hereinafter referred to as column number) of heading image data placed along the fore edge of the book and arranging the heading image data along the thickness direction of the book so that the data is sequentially shifted in the direction orthogonal to the direction of the thickness direction. The column number setting screen G4 includes a column number setting button B41 for inputting the column number, a cancel button B42, and an OK button B43. When the column number setting button B41 is selected, the column number is input with the numeric keys of the operation/display section 30, the column number is set by pushing down the OK button B43 and the set column number is displayed in the column number display area E21 of the heading overlay setting area E2.

An example of the column number will be described with reference to FIG. 6B and FIG. 6C showing a diagram of a side view of an example of a book in which the chapters are divided.

FIG. 6B is a side view of an example of a book which has six chapters and one column. The forming positions 4a to 4f, where the heading images are formed on sheets in the same position with the same size in each chapter, are placed in six positions with respect to chapters along the fore edge of the book and aligned along the thickness direction in one column in a manner that the forming positions of the heading images of the adjacent chapters are different from each other in the direction orthogonal to the thickness (in the present embodiment, sequentially shifted with respect to chapters).

FIG. 6C is a side view of an example of a book which has six chapters and two columns. The forming positions 4a to 4f, where heading images are formed on sheets in the same position with the same size in each chapter, are placed in three positions with respect to chapters along the fore edge of the book and aligned along the thickness direction in two columns in a manner that the forming positions of the heading images of the adjacent chapters are different from each other in the direction orthogonal to the thickness (in the present embodiment, sequentially shifted with respect to chapters).

The manual setting screen G5 of the heading image shown in FIG. 7 is a screen including the second input section for setting with respect to chapters the position of the heading image data for discerning chapters and the third input section for setting with respect to chapters the image size of the heading image data.

The manual setting screen G5 includes a chapter button group B51 including a plurality of chapter buttons B51a showing the set chapters in the chapter division setting area E1.

The manual setting screen G5 includes a position changing button B52 for displaying the position setting screen G6 for setting a position of the heading image data corresponding to the chapter of the chapter button B51a selected among the chapter button group B51 and a position displaying area E51 for displaying a position of the heading image data of the chapter corresponding to the selected chapter button B51a.

The manual setting screen G5 includes a size changing button B53 for displaying the size setting screen G7 for setting an image size of the heading image data of the chapter corresponding to the chapter button B51a selected from the chapter button group B51 and a size display area E52 for displaying an image size of the heading image data of the chapter corresponding to the selected chapter button B51a.

The manual setting screen G5, displays the sheet size of the page image data of the chapter corresponding to the chapter button B51a selected from the chapter button group B51 with xy coordinates, and includes a display area E53 for displaying the position where the heading image data is set on the coordinates and the size (length and width). In the display area E53, X shows the value according to the width of the sheet and Y shows the value according to the length of the sheet.

The position setting screen G6 shown in FIG. 8 includes a x coordinate setting button B61a for inputting the position of the x coordinate of the heading image data (x1), a y coordinate setting button B61b for inputting the position of the y coordinate of the heading image data (y1), a cancel button B62 and an OK button B63.

When the x coordinate setting button B61a is selected, the value of the x coordinate is input with the numeric keys of the operation/display section 30, and when the y coordinate setting button B61b is selected, the value of the y coordinate is input with the numeric keys of the operation/display section 30. Then when the OK button B63 is pushed down, the heading image data position (x1, y1) is set and the set position is displayed on the position display area E51 of the manual setting screen G5.

The size setting screen G7 shown in FIG. 9 includes a length setting button B71a for setting a length as the image size of the heading image data, a width setting button 71b for setting a width of the heading image data, a cancel button B72, and an OK button B73.

When the length setting button B71a is selected, the value of the length is input with the numeric keys of the operation/ display section 30 and when the width setting button B71b is selected, the value of the width is input with the numeric keys of the operation/display section 30. Then when the OK button B73 is pushed down, the length and the width which indicate the image size of the heading image data is set and the set size is displayed in the size displaying area E52 of the manual setting screen G5.

The heading overlay setting area E2 becomes effective when the ON button B34a is selected, and includes a shift button B36a for setting whether or not to perform a shifting processing which shifts page image data according to the position and image size of the heading image data and the reduce button B36b for setting whether or not to perform a reducing processing which reduces the scale of the page image data according to the position and image size of the heading image data. When the shift button B36a is selected the shifting processing is performed, when the reduce button B36b is selected the reducing processing is performed and when the shift button B36a and the reduce button B36b are both selected, the shifting processing and the reducing processing are performed.

When a book with a plurality of chapters including a stack of a plurality of sheets is formed in the finisher device 50, the sheet changing area E3 shown in FIG. 5 includes an ON button B37a for forming an image with respect to chapters using a different type of sheet from the adjacent chapter and an OFF button B37b where the type of sheet is not different with respect to chapters.

When the ON button B37a is selected, an auto-changing button B38a and a manual changing button B38b included in the sheet changing area E3 become effective.

The auto-changing button B38a is a button for displaying a tray setting screen G8 and setting a sheet type with respect to chapters according to a sheet stored in a set tray. The manual changing button B38b is a button for allowing the changing button with respect to chapters B39a to be effective and enabling a user to freely set the type of sheet with respect to chapters.

The tray setting screen G8 shown in FIG. 10 displays the sheet type and the color which shows the type of sheet stored in the sheet feeding tray and includes a tray button group B81 provided according to the number of sheet feeding trays whose tray button B81a may be selected, a cancel button B82, and an OK button B83.

When the tray button B81a is selected and the OK button B83 is pushed down, according to the sheet type stored in the tray corresponding to the selected tray button B81a, the sheet type is set to a different type from the adjacent chapter.

The sheet changing area E3 also includes a group of changing buttons with respect to chapters B39 where a changing button with respect to chapters B39a which displays the sheet type of each chapter is provided according to the number of chapters.

When the auto-changing button B38a is selected, the changing button with respect to chapters B39a displays a sheet type set in each chapter, and when the manual changing button B38b is selected, the changing button with respect to chapter 39a becomes effective, and when the changing button with respect to chapter 39a is selected, the sheet setting screen with respect to chapters G9 for setting sheet type with respect to chapters is displayed.

The sheet setting screen with respect to chapters G9 shown in FIG. 11 is a screen displayed when the changing button with respect to chapters B39a is selected, and is a screen for setting type and color of the sheet on which the page image data of the chapter corresponding to the selected changing button with respect to chapters B39a is formed.

The sheet setting screen with respect to chapters G9 includes a sheet type selecting button B91 for selecting sheet type of a sheet stored in the sheet feeding tray, a color selecting button B92 for selecting a sheet color which may be selected with the sheet type selected with the sheet type selecting button B91, a cancel button B93 and an OK button B94.

When the sheet type is selected with the sheet type selecting button B91, the sheet color is selected with the color selecting button B92 and the OK button B94 is pushed down, the sheet with the selected sheet type and color is displayed in the changing button with respect to chapters B39a and the sheet is set as the sheet for the chapter corresponding to the changing button with respect to chapters B39a.

The sheet type is classified according to material of the sheet and production process, for example, plain paper, coated paper, glossy paper, etc. The sheet color is the color associated with the characteristics of the sheet type material, etc., or the color the sheet type is colored.

The print section 40 forms an image using electrophotography according to input image data and comprises a sheet feeding section 41, a sheet conveying section 42, an image forming section 43 and an ejecting section 44.

The sheet feeding section 41 comprises a plurality of sheet feeding trays 41a, a sheet feeding device 41b, a manual sheet feeding tray T2 and the like. The sheet feeding trays 41a each store a sheet P sorted in advance according to color and sheet type, and the sheet feeding device 41b conveys the sheet P from the top one by one to the sheet conveying section 42. The manual sheet feeding tray T2 can store various types of sheet P to satisfy the user's needs and the sheet feeding device conveys the sheet P from the top one by one to the sheet conveying section 42.

The sheet conveying section 42 conveys the sheet P conveyed from the sheet feeding tray 41a or the manual sheet feeding tray T2 through a plurality of intermediate rollers, registration rollers 42a, etc., and then to a transfer device 43a.

The sheet conveying section 42 uses a conveying path switching board to convey the sheet P with image forming processing performed on one face to the double-face conveying path and conveys the sheet through the intermediate rollers and registration rollers 42a and then to the transfer device 43a again.

The sheet forming section 43 comprises a photoreceptor drum, a charging electrode device, a light exposing device including a laser output section for outputting a laser beam according to the image data and a polygon mirror for the laser beam to scan in a main scanning direction, a developing device, the transfer device 43a, a cleaning section and a fusing device 43b. Specifically, an electrostatic latent image is formed by focusing the laser beam with the light exposing device on the photoreceptor drum charged by the charging electrode device. The developing device deposits charged toner on the surface of the photoreceptor drum where the electrostatic latent image is formed and develops the electrostatic latent image. The toner image formed on the photoreceptor drum with the developing device is transferred onto the sheet P with the transfer device 43a. After the toner image is transferred onto the sheet P, the residual toner, etc. on the surface of the photoreceptor drum is removed by the cleaning section.

The fusing device 43b heat fuses the toner image transferred onto the sheet P conveyed from the conveying section 42. After the fusing processing is performed on the sheet P, the sheet is nipped with a sheet ejection roller of the ejecting section 44 and conveyed from the ejection opening to the finisher device 50.

The finisher device 50 comprises a sorting section for performing sorting processing of sheets with images formed, a punching section to perform punching processing, a stapling section to perform stapling processing to bind a stack of sheets at a set binding position, a folding section to perform folding processing, a cutting section to perform cutting processing, and the like. After various processing is performed or not performed, the sheets are ejected to a sheet ejecting tray T3.

FIG. 2 shows a block diagram showing a control system of the image forming apparatus 1.

As shown in FIG. 2, the image forming apparatus 1 comprises a main body section 1a, a printer controller 1b and a finisher device 50 connected to the main body section 1a. The image forming apparatus 1 is connected to an external apparatus 2 of a network 3 through a LANIF (Local Area Network InterFace) 14 of the printer controller 1b so that information can be sent and received to and from each other.

The main body section 1a comprises the image reading section 20, the operation/display section 30, the print section 40 and an image control board 100. The same reference numerals will be applied to the structures which are the same as the sections described in FIG. 1 and the description will be omitted.

The image control board 100 includes a control section 110, a nonvolatile memory 120, a RAM (Random Access Memory) 130, a reading processing section 140, a compression IC 150, a DRAM (Dynamic Random Access Memory) control IC 160, image memory 170, decompression IC 180 and writing processing section 190.

The control section 110 includes a CPU (Central Processing Unit) and the like, and reads out a specified program from a system program and various application programs stored in the nonvolatile memory 120 and develops the program to the RAM 130. The control section 110 operates with the program developed to the RAM 130 and performs various processing and centrally controls the sections of the image forming apparatus 1.

For example, according to an instruction signal input from the operation/display section 30 or the external apparatus 2, the control section 110 controls the switching between copy mode, printer mode and scanner mode, copying, printing, reading of image data, etc.

The control section 110 reads out the book with heading forming processing program of the present embodiment from the nonvolatile memory 120 and various data such as job data from the RAM 130 and by operating with the program and various data, controls an image forming on sheets according to image data where a plurality of page image data are divided into a plurality of chapters and the processing of forming a book comprising a plurality of chapters which include a plurality of sheets.

When forming a book, the control section 110 operates with the book with heading forming processing program to combine, with respect to chapters, heading image data for discerning chapters in a position and image size along the fore edge of the book set according to the number of chapters, binding position of the book and column number with the page image data and forming the image on the sheet in the image forming section 43.

The control section 110 combines the heading image data according to the position or image size of the heading image data set by the user from the operation/display section 30 with the page image data and forms an image on the sheet in the image forming section 43.

The control section 110 sets the type of sheet with respect to chapters with a different type of sheet (sheet type or color) from the adjacent chapter and forms an image on the set type of sheet.

The nonvolatile memory 120 stores various processing programs and data concerning image forming, a book with heading forming processing program according to the present embodiment, heading image data, the value of the pre-set width of the heading image data, the data for setting the finisher device 50 through the print section 40 for finisher on the sheet P with the image formed, data processed in various programs, and the like.

The RAM 130 forms a work area for temporarily storing various programs performed by the control section 110 and data concerning these programs, job data, etc.

FIG. 12 shows an example of job data.

As shown in FIG. 12, job data 131 comprises common data of page image data (page common data 131a) and data with respect to page image data (page individual data 131b).

Page common data 131a includes various setting conditions set according to instruction signals input from the external apparatus 2 or operation/display section 30 and data showing the operation status of the image forming operation and the finishing operation.

For example, page common data 131a includes chapter division D1 showing whether or not the chapter was set in the chapter division setting area E1 of the chapter setting screen G3 (setting of whether or not chapter division is set), chapter division number D2 showing a chapter division number N set in the chapter division setting area E1, a heading overlay D3 showing whether the ON button B34a or the OFF button B34b is selected in the heading overlay setting area E2, a column number D4 showing the column number S set in the column number setting screen G4, a number of chapters per column D5 showing a number of chapters NS which can be aligned in one column which is a quotient of the chapter division number N divided by the column number S, and a binding position D6 showing the binding position set in the binding position setting screen G1.

The page common data 131a includes a position D7a for showing a position of the x coordinate of the heading image data (x coordinate), a position D7b for showing a position of the y coordinate of the heading image data (y coordinate), a length D7c showing the length of the heading image data and a width D7d showing the width of the heading image data, which are all set with respect to chapters.

The page common data 131a includes a shift D8 for showing whether or not the shift button B36a of the heading overlay setting area E2 of the chapter setting screen G3 is selected (ON shows selected and OFF shows not selected), a reduction D9 showing whether or not the reduce button B36b is selected (ON shows selected and OFF shows not selected), a shift amount D10 showing a shift amount [mm] of the pre-set page image data, a reduction percentage D11 showing a reduction percentage [%] of the pre-set page image data, and a cutting D12 showing whether or not the cutting processing is set on the cutting setting screen G2.

The page common data 131a includes sheet change with respect to chapters D13 showing whether the ON button B37a or the OFF button B37b is selected in the sheet changing area E3 of the chapter setting screen G3. The page common data 131a also includes sheet type D14a showing type of sheet and color D14b showing color of the sheet, which are set with respect to chapters.

In the page individual data 131b, an identification number is applied to each page image data (for example, page 1, page 2 and so on) which are included in the read image data and the data are individually stored. The page image data includes image storage address D21 showing an address of where the page image data is stored in the image memory 170, a chapter number D22 showing the number (chapter number) for identifying the chapter set in the chapter division setting area E1 and the like.

The reading processing section 140 performs various processing such as analog processing, A/D conversion processing, shading processing, etc. on the analog image signal input from the image reading control section 200 of the image reading section 20 and generates digital image data. The generated image data is output to the compression IC 150.

The compression IC 150 performs compression processing on the input digital image data and outputs the data to the DRAM control IC 160.

According to an instruction from the control section 110, the DRAM control IC 160 controls the compression processing of the image data by the compression IC 150 and the decompression processing of the compressed image data by the decompression IC 180 and controls the input and output of the image data to and from the image memory 170. For example, when storage of an image signal read by the image reading section 20 is instructed, the DRAM control IC 160 controls the compression IC 150 so that compression processing is performed on the image data input from the reading processing section 140 and stores the compressed image data in a compression memory 171 of the image memory 170. When the printing output of the compressed image data stored in the compression memory 171 is instructed, the DRAM control IC 160 reads out the compressed image data from the compression memory 171, controls the decompression IC 180 to perform the decompression processing and stores the data in a page memory 172. When the printing output of the image data stored in the page memory 172 is instructed, the image data is read out from the page memory 172 and output to the reading processing section 190.

The image memory 170 comprises the compression memory 171 and the page memory 172 configured from a DRAM (Dynamic RAM). The compression memory 171 is a memory for storing compressed image data and the page memory 172 is a memory for temporarily storing image data for printing output (print data).

The decompression IC 180 performs decompression processing on input compressed image data.

The writing processing section 190 generates print data for forming an image according to image data input from the DRAM control IC 160 and outputs the data to the print section 40.

The image reading section 20 comprises the CCD 22a and the image reading control section 200, and also comprises the automatic document feeding section 21, the reading section 22, and the like which are not shown here but shown in FIG. 1. The image reading control section 200 controls the automatic document feeding section 21, the reading section 22, etc., so that the document is scanned with a light exposure, a photoelectric conversion is performed with the reflected light by the CCD 22a and the image is read. The read analog image signal is output to the reading processing section 140.

The operation/display section 30 comprises an LCD (Liquid Crystal Display), a touch panel 31 provided so as to cover the LCD, an operation/display control section 300, and an operation key group (not shown) such as numeric keys, etc. According to a display signal input from the control section 110, the operation/display control section 300 controls the LCD to display various setting screens for inputting various setting conditions, various screens such as those shown in FIG. 3 to FIG. 11 and various processing results. The operation/display control section 300 outputs operation signals input from the operation key group or the touch panel 31 to the control section 110.

The print section 40 comprises a print control section 400 and sections concerning printing output such as image forming section 43 shown in FIG. 1. According to an instruction from the control section 110, the print control section 400 controls the operation of the sections of the print section 40 such as the image forming section 43 so that an image is formed on the sheet P according to the print data input from the writing processing section 190 and also according to an instruction from the control section 110 outputs an instruction signal to the finisher control section 500 to control the operation of the sections of the finisher device 50.

Next, the sections of the printer controller 1b will be described. When the image forming apparatus 1 is used as a network printer, the printer controller 1b manages and controls the job input from the external apparatus 2 connected to the network 3 to the image forming apparatus 1, and receives data to be printed from the external apparatus 2 and transmits the data as job data to the main body section 1a.

The printer controller 1b comprises a controller control section 11, a DRAM control IC 12, an image memory 13 and a LANIF 14.

The controller control section 11 centrally controls the operation of the sections of the printer controller 1b, and transmits the data input from the external apparatus 2 through the LANIF 14 as a job to the main body section 1a.

The DRAM control IC 12 controls the storage of the data received from the LANIF 14 in the image memory 13 and the read out of data from the image memory 13. The DRAM control IC 12 is connected to the DRAM control IC 160 of the image control board 100 with a PCI (Peripheral Components Interconnect) bus, and according to an instruction from the controller control section 11, reads out the data to be printed from the image memory 13 and outputs the data to the DRAM control IC 160.

The image memory 13 comprises a DRAM and temporarily stores output data which is input.

The LANIF 14 is a communication interface for connecting an NIC (Network Interface Card), a modem, and the like to a network 3 such as a LAN, and receives data from the external apparatus 2. The received data is output to the DRAM control IC 12.

The finisher device 50 is provided with various finisher units such as a sorting section (not shown), a punching section (not shown), a stapling section, a folding section, a cutting section etc., and a conveying device such as conveying rollers, etc., for conveying the sheet to various finisher units. The various finisher units are centrally controlled by a finisher control section 500. According to the instruction signal of finishing input from the control section 110 through the print control section 400, the finisher control section 500 conveys the sheet P along the conveying path to the predetermined processing unit, controls the sections to perform the predetermined finishing on the sheet P and controls the ejection to the predetermined sheet ejection tray.

Next, the operation of the present embodiment will be described.

Figure 13:
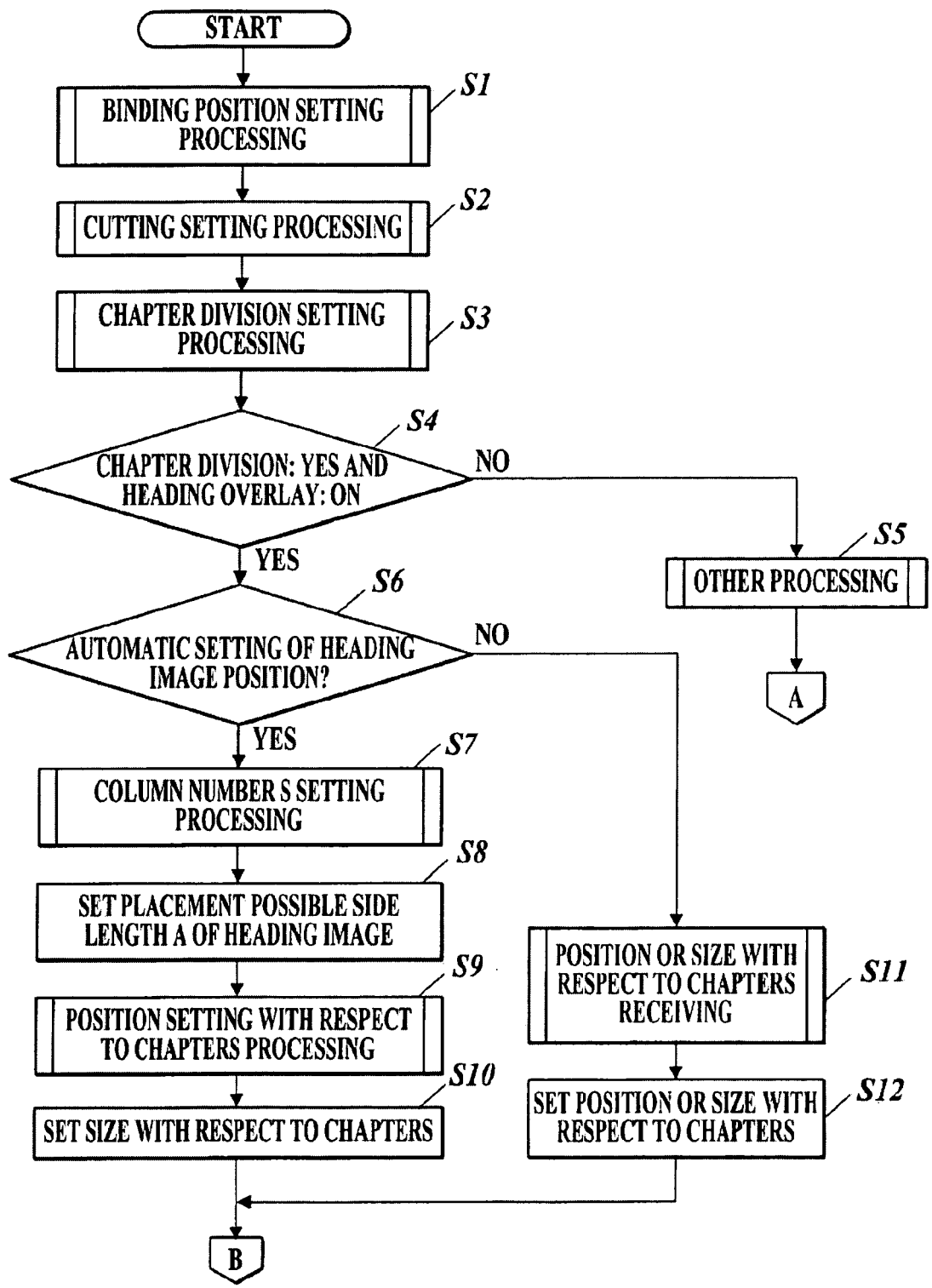
FIG. 13 is a flow chart showing a processing of forming a book with heading.
Figure 14:
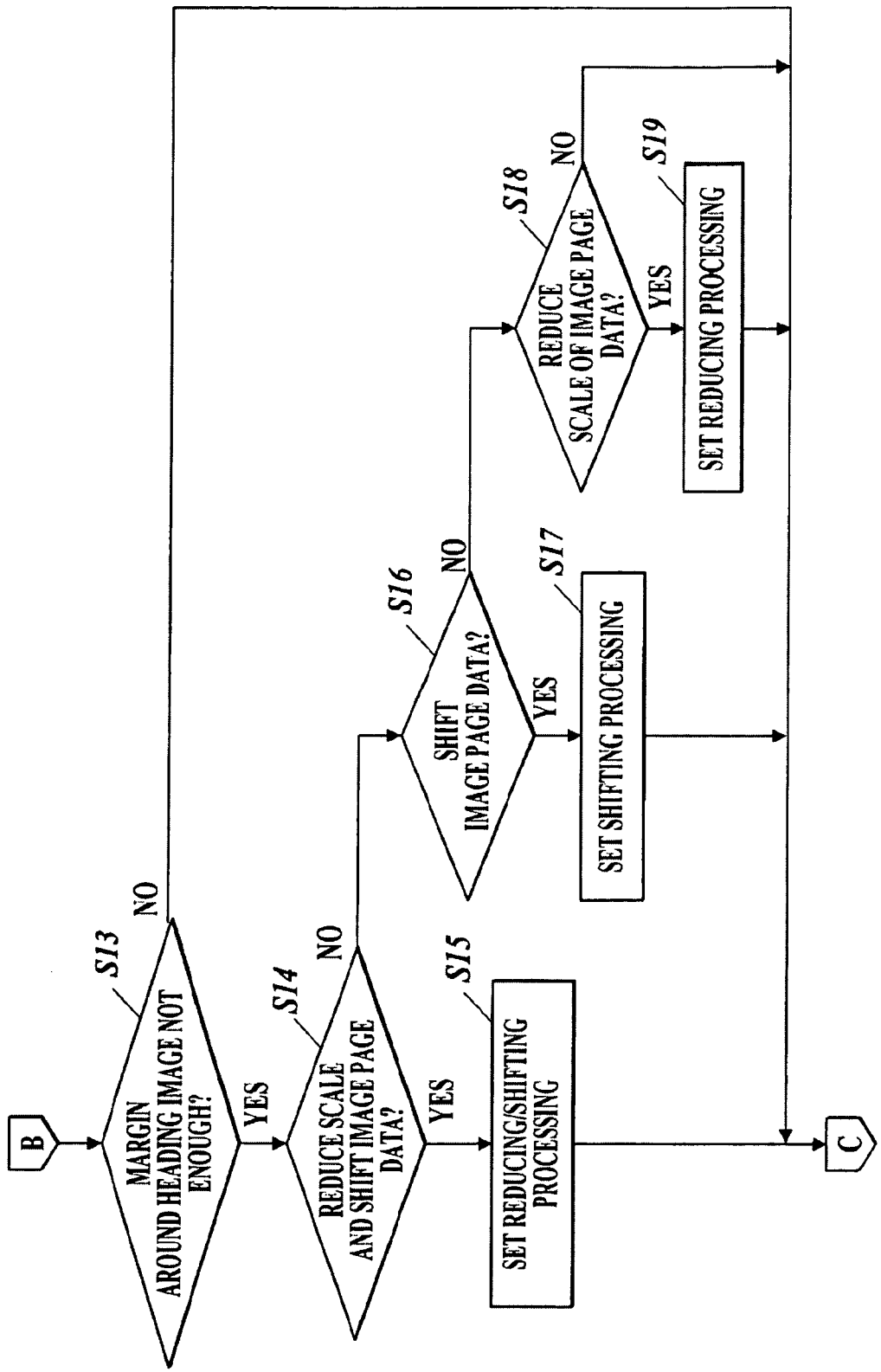
FIG. 14 is a flow chart showing a processing of forming a book with heading (continuation of FIG. 13)
Figure 15:
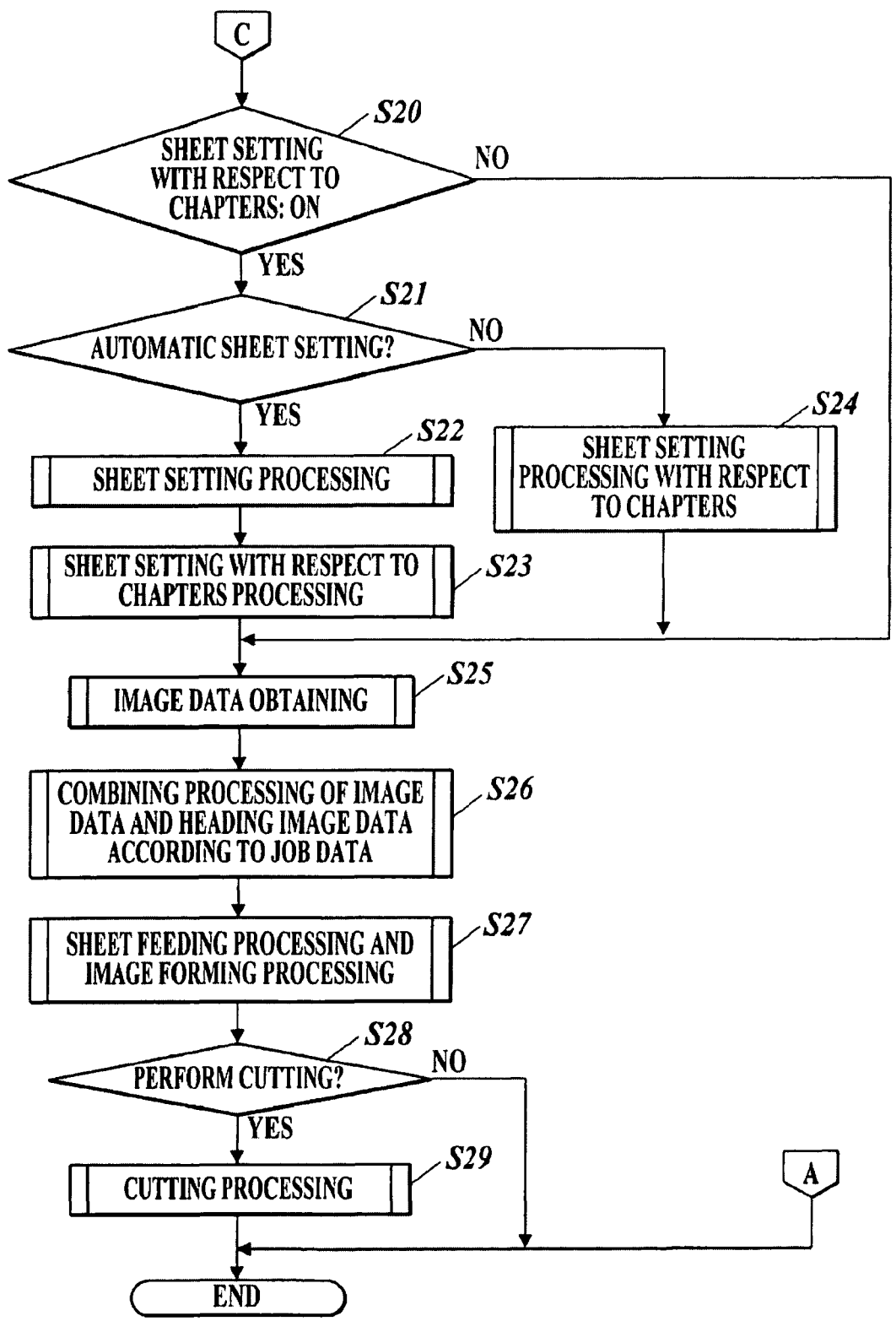
FIG. 15 is a flow chart showing a processing of forming a book with heading (continuation of FIG. 13 and FIG. 14)

FIG. 13, FIG. 14 and FIG. 15 show a flow chart of the book with heading forming processing of the present embodiment. The flow chart shown in FIG. 13, FIG. 14 and FIG. 15 is processing performed by the control section 110.

First, according to an instruction from the operation/display section 30, the control section 110 performs the binding position setting processing (step S1). In the binding position setting processing, the binding position setting screen G1 is displayed on the LCD of the operation/display section 30 and the binding position set on the binding position setting screen G1 is set as binding position D6 of the job data.

According to an instruction from the operation/display section 30, the control section 110 performs the cutting setting processing (step S2). In the cutting setting processing, the cutting setting screen G2 is displayed on the LCD of the operation/display section 30 and the setting whether or not to perform cutting processing set on the cutting setting screen G2 is set as cutting D12 of the job data.

According to an instruction from the operation/display section 30, the control section 110 performs the chapter division setting processing (step S3). In the chapter division setting processing, the chapter setting screen G3 is displayed on the LCD of the operation/display section 30 which receives the setting instruction of the first page of each chapter on the chapter division setting area E1, and performs the setting of dividing the image data into a plurality of chapters according to the received first page.

The order of steps S1 to S3 is not limited to this order.

The control section 110 determines whether or not the chapter division setting was performed in the chapter division setting area E1 on the chapter setting screen G3 displayed on the LCD of the operation/display section 30 and whether or not the ON button B34a is selected on the heading overlay setting area E2, that is, determines whether or not in the job data the chapter division D1 is set to yes and the heading overlay D3 is set to ON (step S4).

When the chapter division is not set in the chapter division setting area E1 or the ON button B34a of the heading overlay setting area E2 is not selected (step S4; No), the control section 110 advances to another processing and this processing ends.

When the chapter division is set in the chapter division setting area E1 and the ON button B34a of the heading overlay setting area E2 is selected (step S4; Yes), the control section 110 determines whether or not to set the position of combining the heading image data with the page image data according to the set column number, number of chapters, binding position, etc., that is, whether or not the auto-combining button B35a of the heading overlay setting area E2 is selected (step S6).

When the auto-combining button B35a of the heading overlay setting area E2 is selected (step S6; Yes), the control section 110 performs the setting processing of the column number S (step S7). In the setting processing of the column number S, the column number setting screen G4 is displayed on the LCD of the operation/display section 30 and a setting instruction of the column number S is received from the operation/display setting section 30 and the received column number S is set as the column number D4 of the job data.

According to the binding position set in step S1, the control section 110 sets the length of one side of a sheet where the heading image data is to be placed (hereinafter referred to as placement possible side length A) (step S8). In the processing in step S8, when the sheet size is, defined based on the origin point (0, 0) of the xy coordinates, for example, when the binding position is right or left binding, the maximum value Y of the y coordinate is set as the placement possible side length A, and when the binding position is top binding, the maximum value X of the x coordinate is set as the placement possible side length A. That is, the value Y of the y coordinate of the coordinate (X, Y) which is at the corner of the sheet diagonal to the origin point (0, 0) is set to the placement possible side length A when the binding is right or left binding and the value X of the x coordinate is set to the placement possible side length A when the binding is top binding.

The control section 110 refers to the job data and according to the binding position, the set chapter division number N, the column number S, the placement possible side length A, and the reference position coordinates depending on the binding position set in advance in the nonvolatile memory 120, the position setting processing with respect to chapters which sets the position with respect to chapters is performed (step S9).

In the position setting processing with respect to chapters, the number of chapters per column NS is calculated according to the chapter division number N and the column number S and the calculated number of chapters per column NS is set as D5 of the job data.

By referring to the job data, the maximum length of the heading image data (hereinafter referred to as the maximum length MW) is calculated according to the placement possible side length A and the number of chapters per column NS. The maximum length MW of the present embodiment is to be calculated with the heading image data equally along the side of the fore edge of the book, and may be calculated by obtaining the value of dividing the placement possible side length A with the number of chapters per column NS. Thus in the present embodiment, when the heading image data is placed equally along the fore edge, the number of chapters per column NS is calculated larger when the column number is small (for example one column), than when the column number is large (for example two columns), and the maximum length MW is calculated smaller when the column number is small (for example one column) than when the column number is large (for example two columns).

According to the calculated maximum length MW, the binding position and the reference position coordinates, the position of the heading image data with respect to chapters is set, and the set position of the heading image data with respect to chapters (x coordinate, y coordinate) is set as position (x coordinate) D7a and position (y coordinate) D7b of the job data.

Figure 16:
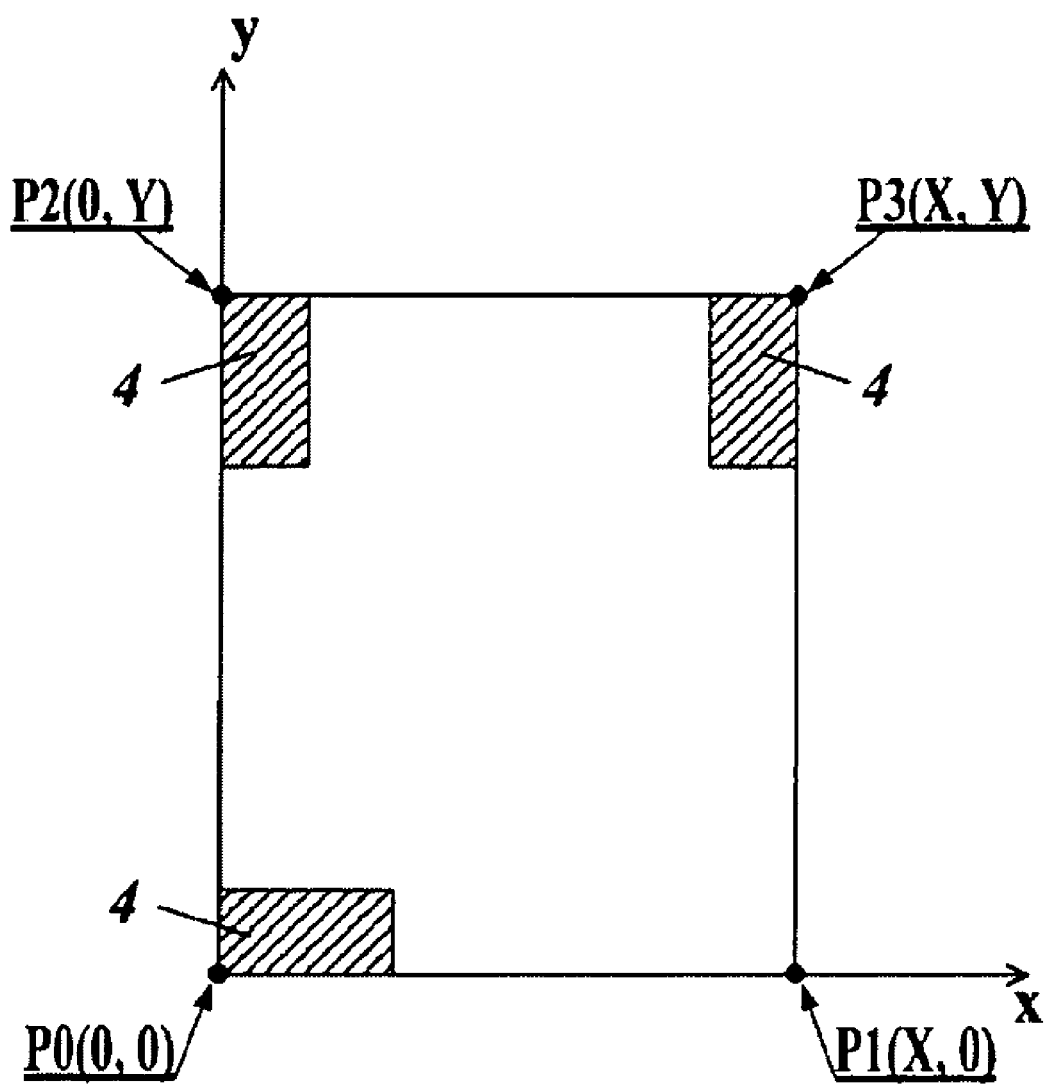
FIG. 16 is a diagram showing an example of reference position coordinates according to binding position.

FIG. 16 shows an example of reference position coordinates according to the binding position. The shaded areas shows areas where heading image 4 is formed according to the heading image data.

As shown in FIG. 16, one corner of the sheet is set as origin point P0 (0, 0) of the xy coordinates, and when the sheet size is defined on the xy coordinates, the position of the corner on the x coordinate is P1 (X, 0), the position of the corner on the y coordinate is P2 (0, Y), and the position of the corner in the position on the diagonal line of the origin point is P3 (X, Y).

In FIG. 16, the value of the x coordinate becomes smaller in the right direction, and becomes larger in the left direction, and the value of the y coordinate becomes smaller in the downward direction and larger in the upward direction. Here, the reference position coordinates of the heading image data is set to, P2 (0, Y) when the binding position is right binding, P3 (X, Y) when the binding position is left binding, and P0 (0, 0) when the binding position is top binding.

The position of the heading image data with respect to chapters is set according to the reference position coordinates depending on the binding position as shown in FIG. 16, the maximum length MW, and the binding position. For example, when the binding is left binding, as for the position of the heading image data, the heading image data is to be placed on the edge of the position opposing to left binding (right side), and the position of the heading image data of chapter one (x1, y1) is set to (x1=X, y1=Y), the position of the heading image data of chapter two (x2, y2) is set to (x2=X, y2=Y−MW), and the position of the heading image data of chapter n (xn, yn) is set to (xn=X, yn=Y−(MW×(n−1))). In other words, as for the position of the heading image data with respect to chapters when the binding is left binding, the x coordinate is set to the value X of the x coordinate of the reference position coordinates and the y coordinate is set to the value where the maximum length MW is sequentially subtracted from the value Y of the y coordinate of the reference position coordinates.

When the binding is right binding, as for the position of the heading image data, the heading image data is to be placed on the edge of the position opposing to right binding (left side), and the position of the heading image data of chapter one (x1, y1) is set to (x1=0, y1=Y), the position of the heading image data of chapter two (x2, y2) is set to (x2=0, y2=Y−MW), the position of the heading image data of chapter n (xn, yn) is set to (xn=0, yn=Y−(MW×(n−1))). In other words, similar to left binding, as for the position of the heading image data with respect to chapters when the binding is right binding, the x coordinate is set to the value 0 of the x coordinate of the reference position coordinates and the y coordinate is set to the value where the maximum length MW is sequentially subtracted from the value Y of the y coordinate of the reference position coordinates.

When the binding is top binding, as for the position of the heading image data, the heading image data is to be placed on the edge of the position opposing to top binding (bottom side), and the position of the heading image data of chapter one (x1, y1) is set to (x1=0, y1=0), the position of the heading image data of chapter two (x2, y2) is set to (x2=MW, y2=0), the position of the heading image data of chapter n (xn, yn) is set to (xn=MW×(n−1), yn=0). In other words, as for the position of the heading image data when the binding is top binding, the y coordinate is set to the value 0 of the y coordinate of the reference position coordinates and the x coordinate is set to the value where the maximum length MW is sequentially added to the value 0 of the x coordinate of the reference position coordinates.

As described above, in step S8, the length of the side where the heading image data is placed (placement possible side length A) can be set depending on the binding position. In step S9 the image size of the heading image data (length of the heading image data=maximum length MW) can be set according to the placement possible side length A set depending on the binding position, the number of chapter division, and column number, and the position of the heading image data with respect to chapters can be set according to binding position, on the edge of the position opposing to the binding position.

The control section 110 sets the maximum length MW calculated in step S9 and the width set in the nonvolatile memory 120 in advance as the image size (length, width) of the heading image data with respect to chapters, and sets the set size (length, width) of the heading image data with respect to chapters as the length D7c and the width D7d of the job data (step S10).

When the auto-combining button B35a of the heading overlay setting area E2 is not selected and the manual combining button B35b is selected (step S6; No), the control section 110 displays the heading image manual setting screen G5 on the LCD of the operation/display section 30 and receives a setting of the position and image size of the heading image data with respect to chapters (step S11), and sets the received position and image size of the heading image data with respect to chapters as the position (x coordinate) D7a, position (y coordinate) D7b, length D7c, and width D7d of the job data (step S12).

After the step S10 or the step S12, the control section 110 determines whether or not the shift button B36a or the reduce button B36b is selected in the heading overlay setting area E2 in a case where margin areas set in advance are not enough around the heading image data when the heading image data is combined with the page image data (step S13).

When the shift button B36a and the reduce button B36b are not selected in the heading overlay setting area E2 (step S13; No), the control section 110 advances the processing to step S20.

When the shift button B36a or the reduce button B36b is selected in the heading overlay setting area E2 (step S13; Yes), the control section 110 determines whether or not the shift button B36a and the reduce button B36b are selected, that is, determines whether or not there is an instruction to reduce the scale and shift the page image data in a case where the margin areas set in advance are not enough around the heading image data when the heading image data is combined with the page image data (step S14).

When the shift button B36a and the reduce button B36b are selected (step S14; Yes), the control section 110 sets the shift D8 and the reduction D9 of the job data to ON as a setting to perform the reduction/shifting processing which reduces the scale and shifts the page image data in a case where the margin areas set in advance are not enough around the heading image data when the heading image data is combined with the page image data (step S15).

When the shift button B36a and the reduce button B36b are not selected (step S14; No), the control section 110 determines whether or not the shift button B36a is selected, that is, determines whether or not there is an instruction to shift the page image data in a case where the margin areas set in advance are not enough around the heading image data when the heading image data is combined with the page image data (step S16).

When the shift button B36a is selected (step S16; Yes), the control section 110 sets the shift D8 of the job data to ON and the reduction D9 of the job data to OFF as a setting to perform the shifting processing which shifts the page image data in a case where the margin areas set in advance are not enough around the heading image data when the heading image data is combined with the page image data (step S17).

When the shift button B36a is not selected (step S16; No), the control section 110 determines whether or not the reduce button B36b is selected, that is, determines whether or not there is an instruction to reduce the scale of the page image data in a case where the margin areas set in advance are not enough around the heading image data when the heading image data is combined with the page image data (step S18).

When the reduce button B36b is selected (step S18; Yes), the control section 110 sets the shift D8 of the job data to OFF and the reduction D9 of the job data to ON as a setting to perform the reduce processing which reduces the scale of the page image data in a case where the margin areas set in advance are not enough around the heading image data when the heading image data is combined with the page image data (step S19).

When the reduce button B36b is not selected (step S18; No), the control section 110 advances the processing to step S20.

In the shifting processing, the page image data is shifted toward the binding position in a value shown in the shift amount D10 set in advance in the job data in a case where the margin areas set in advance are not enough around the heading image data when the heading image data is combined with the page image data. Then, it is determined whether or not the margin areas set in advance around the heading image data is enough, and according to the result, the page image data is shifted again in a value shown in the shift amount D10 and the shifting processing is repeated until a margin area set in advance around the heading image data is obtained.

In reduction processing, the scale of the page image data is reduced in a value shown in the reduction percentage D11 set in advance in the job data in a case where the margin areas set in advance are not enough around the heading image data when the heading image data is combined with the page image data. Then, it is determined whether or not the margin areas set in advance around the heading image data is enough, and according to the result, the scale of the page image data is reduced again in a value shown in the reduction percentage D11 and the reduction processing is repeated until a margin area set in advance around the heading image data is obtained.

In the reduction/shifting processing, first the shifting processing is performed and repeated until a margin area set in advance around the heading image data is obtained. Then it is determined whether or not the shifted page image data is outside the area of where an image can be formed on the sheet, and when a portion of the page image data shifted in the shifting processing is outside the area of where an image can be formed on the sheet, the reduction processing is performed, and repeats the reduction processing until the page image data falls within the area of where an image can be formed on the sheet.

Determining whether or not there is a margin in the shifting processing, reduction processing and reduction/shifting processing can be done by determining whether or not there are black pixels or by using other known image processing techniques, thus the detailed description is omitted.

After any of step S13; No, step S15, step S17, step S18; No or step S19, the control section 110 determines whether or not the ON button B37a of the sheet changing area E3 of the chapter setting screen G3 is selected, that is, whether or not the sheet change with respect to chapters D13 of the job data is set to ON (step S20).

When the ON button B37a of the sheet changing area E3 is not selected (step S20; No), the control section 110 advances the processing to step S25.

When the ON button B37a of the sheet changing area E3 is selected (step S20; Yes), the control section 110 determines whether or not the setting of the sheet type on which the page image data of each chapter is to be formed is set according to the set sheet feeding tray, that is, whether or not the auto-changing button B38a of the sheet changing area E3 is selected (step S21).

When the auto-changing button B38a of the sheet changing area E3 is selected (step S21; Yes), the control section 110 performs the setting processing of the sheet feeding tray where the sheet of the type to be used is stored (setting processing of sheet)(step S22). In the setting processing of the sheet, the tray setting screen G8 is displayed on the LCD of the operation/display section 30 and the type of sheet stored in the sheet feeding tray corresponding to the tray button B81a selected on the tray setting screen G8 is set as the sheet where the page image data is to be formed.

According to the sheet type (sheet feeding tray) set in step S22, the control section 110 performs the sheet setting with respect to chapters processing which sets the type of sheet on which the page image data of each chapter is to be formed (step S23). In the sheet setting with respect to chapters processing, the sheet type is set so that the sheet type is different from the sheet type on which the page image data of the adjacent chapter is formed (for example, a sheet type (sheet feeding tray) is sequentially set with respect to chapters from the first chapter), and the sheet type and color showing the type of sheet (sheet feeding tray) on which the page image data of the set chapters is formed are set as sheet type D14*a* and color D14*b* of the job data.

When the auto-changing button B38*a* of the sheet changing area E3 is not selected and the manual changing button B38*b* is selected (step S21; No), the control section 110 performs the sheet setting processing with respect to chapters (step S24). In the sheet setting processing with respect to chapters, the changing button group B39 with respect to chapters in the sheet changing area E3 of the chapter setting screen G3 displayed on the LCD of the operation/display section 30 can be selected, and when any of the changing button with respect to chapters B39*a* is selected, the sheet setting screen with respect to chapters G9 corresponding to the selected changing button with respect to chapters B39*a* is displayed, the setting of the sheet type or color showing the type of sheet on which the page image data of each chapter is to be formed is received, and the received sheet type or color of the sheet on which the page image data of each chapter is to be formed are set as sheet type D14*a* and color D14*b* of the job data.

As shown above, the page common data 131*a* of the job data are set by the steps S1 to S24.

After any of step S20; No, step S23, or step S24, the control section 110 obtains image data including a plurality of page image data, and an identification number is applied to each page image data which comprise the obtained image data and the data are individually stored in the image memory 170. The address of where each page image data is stored in the image memory 170 and chapter number are set as image storage address D21 and chapter number D22 of the job data (step S25). The image data may be obtained from the external apparatus 2 connected through the network 3 or the image reading section 20.

According to the job data, the control section 110 performs the combining processing of each page image data of the obtained image data with the heading image data (step S26). In the combining processing, according to the job data, the control section 110 combines the heading image data whose position and image size is set according to chapters with the page image data, determines whether or not the margin areas set in advance around the heading image data are enough, performs the reduction or shifting processing set in the job data according to the result of the determination, and print data comprising a plurality of print page data is generated.

According to the job data, the control section 110 controls the print section 40 to feed the sheet from the sheet feeding tray which stores the type of sheet set with respect to chapters, performs the image forming according to the print data on the fed sheet, and ejects the sheets to the finisher device 50 (step S27).

The control section 110 determines whether or not the cutting processing is set to yes, that is, determines whether or not the cutting 12 of the job data is set to yes (step S28), and when the cutting processing is set to yes (step S28; Yes), the control section 110 controls the finisher device 50 to perform the cutting processing on the stack of ejected sheets (step S29) and the processing ends.

When the cutting processing is set to no (step S28; No) the control section 110 ends the processing.

According to the present embodiment the position and image size of the heading image data for discerning each chapter provided along the fore edge of the book are set with respect to chapters according to number of chapters, binding position, column number and the image forming section may form an image on the sheet by combining the set heading image data with the page image data, thus, a book whose chapter is divided in which the chapters may be easily discerned with one glance may be formed.

A user may set the position and image size of the heading image data freely with respect to chapters on the heading image manual setting screen G5 for instructing with respect to chapters the setting of the position or image size of the heading image data for discerning each chapter.

The present invention is not limited to the above-described embodiments and may be suitably modified within the scope of the present invention.

According to an aspect of the preferred embodiments of the present invention, there is provided an image forming apparatus which forms an image on a sheet, comprising:

an image forming section to form images on sheets according to a plurality of page image data divided in a plurality of chapters;

a finisher section for forming a book with the sheets divided in chapters; and a control section to combine heading image data with the page image data with respect to chapters in a matter that positions of the heading image data to discern chapters are along a fore edge of the book and to allow the image forming section to form the images when the book is formed by the finisher section.

According to an aspect of the preferred embodiments, it is possible to easily discern each chapter in a stack of sheets including a plurality of chapters.

Preferably, the control section determines the position of the heading image data according to a number of the chapters.

Also, the position of the heading image data may be set according to the number of the chapters.

Preferably, the finisher section includes a stapling section to form the book by binding the plurality of sheets, and the control section determines the position of the heading image data according to a binding position by the stapling section.

Also, the position of the heading image data may be set according to the binding position of the plurality of sheets bound by the stapling section.

Preferably, the image forming apparatus further comprises a first input section to receive a setting of a column number of the heading image data aligned along a thickness direction of the book in a manner sequentially shifted in a direction orthogonal to the thickness, wherein the control section forms the heading image data according to the column number set on the first input section.

Also, the position of the heading image data may be set according to the set column number.

Preferably, the image forming apparatus further comprises a second input section to receive a setting of a position of the heading image data with respect to chapters when the finisher section forms the books wherein the control section combines the heading image data with the page image data according to the position of the heading image data set on the second input section.

Also, the user may freely set the position of the heading image data with respect to chapters with the second input section for instructing with respect to chapters the setting of the position of the heading image data for discerning each chapter.

Preferably, the image forming apparatus further comprises a third input section to receive a setting of an image size of the heading image data with respect to chapters, wherein the control section combines the heading image data with the page image data according to the image size of the heading image data set on the third input section.

Also, the user may freely set the image size of the heading image data with respect to chapters with the third input section for instructing with respect to chapters the setting of the image size of the heading image data for discerning each chapter.

The present U.S. Patent Application claims priority under the Paris Convention of Japanese Patent Application No. 2007-114547 filed on Apr. 24, 2007 to the Japanese Patent Office, which shall be a basis for correcting mistranslations.

What is claimed is:

1. An image forming apparatus which forms an image on a sheet, comprising:
    an image forming section to form images on sheets according to a plurality of page image data divided in a plurality of chapters;
    a finisher section for forming a book with the sheets divided in chapters; and
    a control section to combine heading image data with the page image data with respect to chapters in a matter that positions of the heading image data to discern chapters are along a fore edge of the book and to allow the image forming section to form the images when the book is formed by the finisher section.

2. The image forming apparatus of claim 1, wherein the control section determines the position of the heading image data according to a number of the chapters.

3. The image forming apparatus of claim 1, wherein the finisher section includes a stapling section to form the book by binding the plurality of sheets, and the control section determines the position of the heading image data according to a binding position by the stapling section.

4. The image forming apparatus of claim 1, further comprising a first input section to receive a setting of a column number of the heading image data aligned along a thickness direction of the book in a manner sequentially shifted in a direction orthogonal to the thickness, wherein
    the control section forms the heading image data according to the column number set on the first input section.

5. The image forming apparatus of claim 1, further comprising a second input section to receive a setting of a position of the heading image data with respect to chapters when the finisher section forms the book, wherein
    the control section combines the heading image data with the page image data according to the position of the heading image data set on the second input section.

6. The image forming apparatus of claim 5, further comprising a third input section to receive a setting of an image size of the heading image data with respect to chapters, wherein
    the control section combines the heading image data with the page image data according to the image size of the heading image data set on the third input section.

* * * * *